May 12, 1959  V. R. FARNSWORTH  2,885,831
UNIVERSAL GRINDER
Filed Feb. 21, 1957  4 Sheets-Sheet 1

INVENTOR.
VERL R. FARNSWORTH
BY Miles Henninger
ATTORNEY

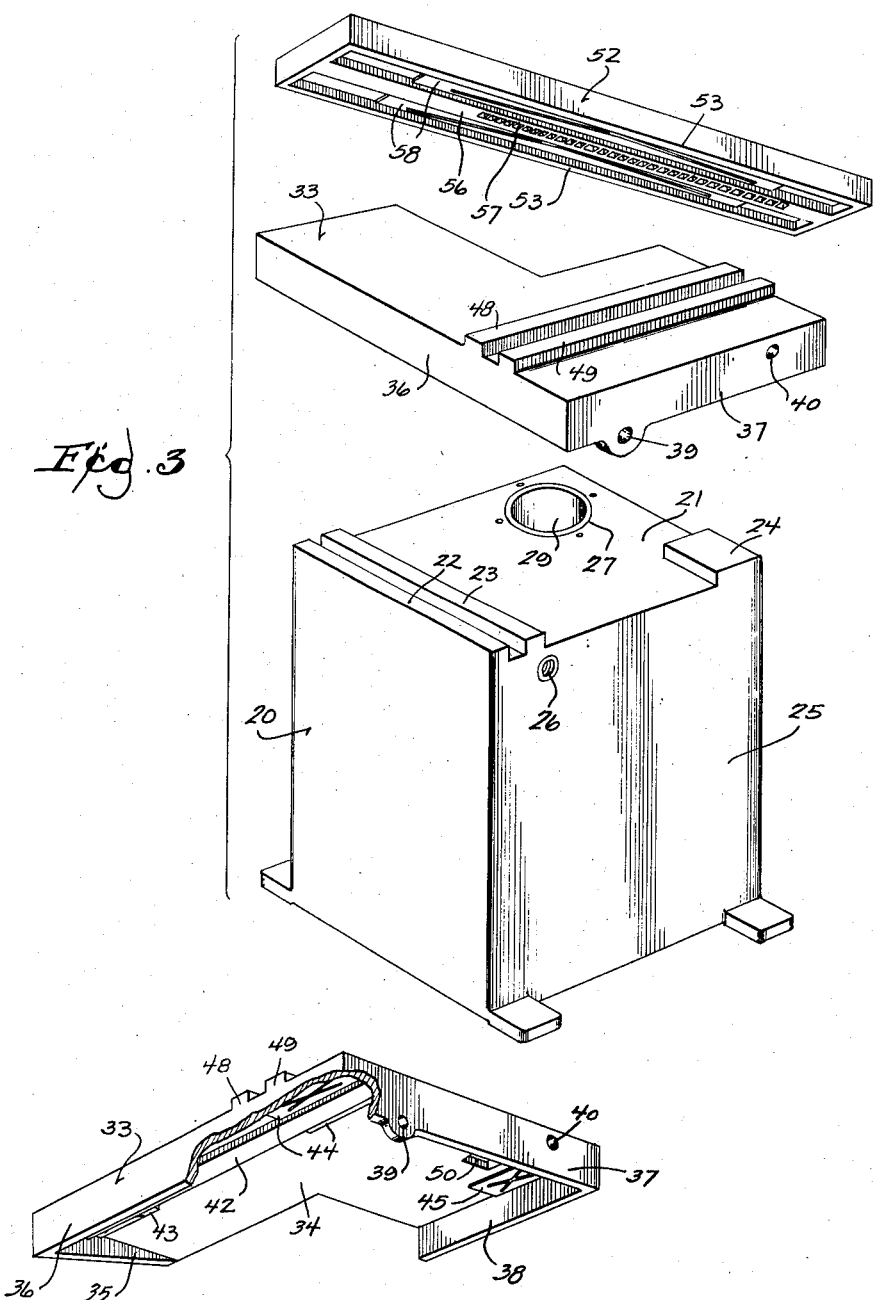

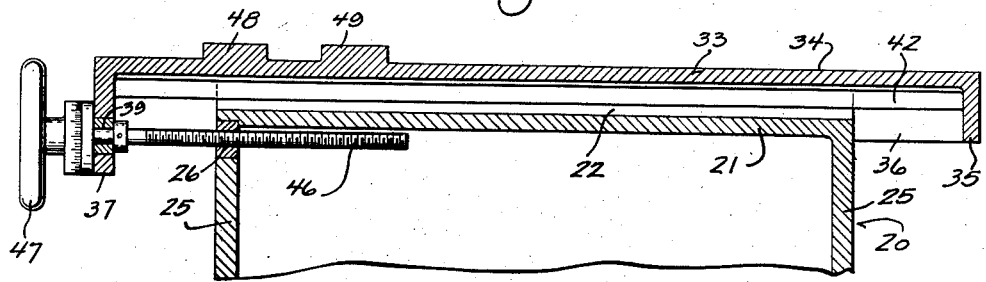
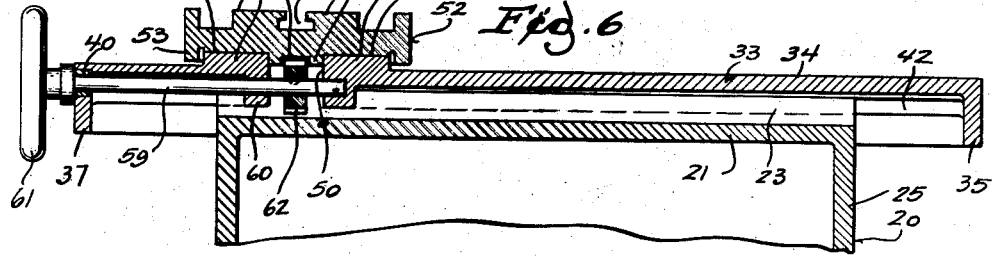
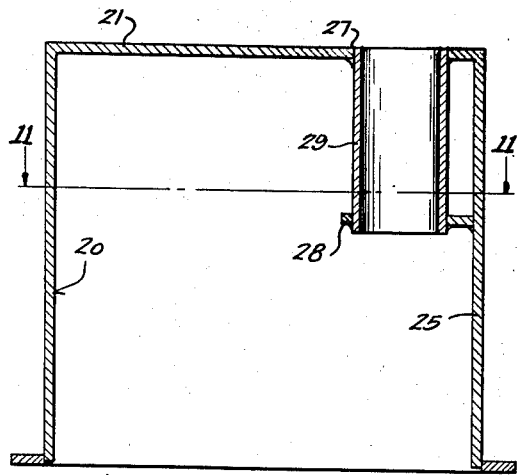
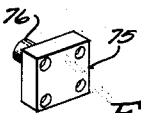
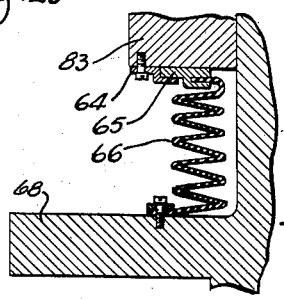

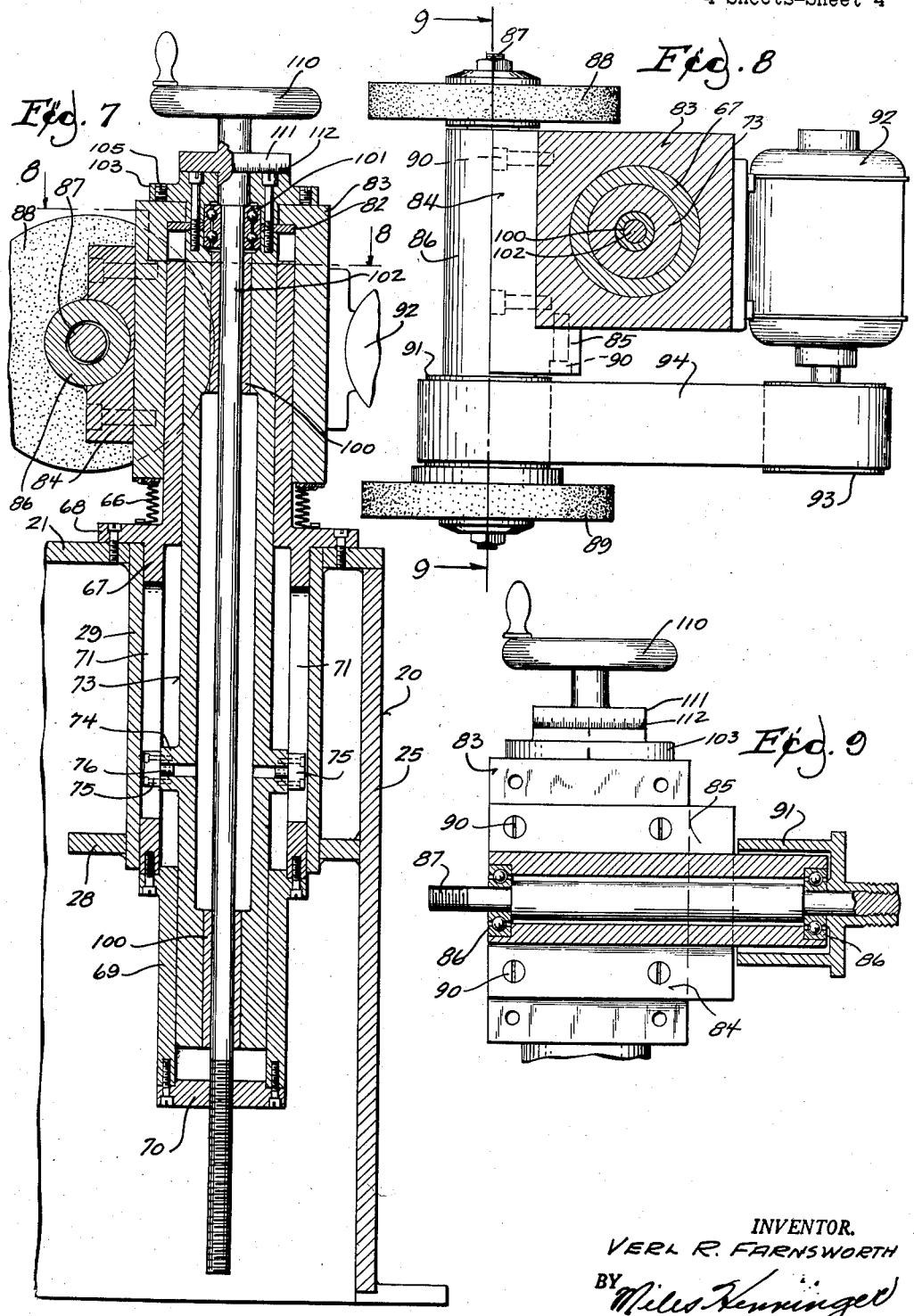

United States Patent Office
2,885,831
Patented May 12, 1959

2,885,831

UNIVERSAL GRINDER

Verl R. Farnsworth, Milwaukee, Wis.

Application February 21, 1957, Serial No. 641,593

7 Claims. (Cl. 51—92)

This invention relates to improvements in machine tools and particularly to a combination grinder for both cylindrical and plane surface grinding.

Grinders which are intended for universal use, i.e., both as cylindrical grinders and as surface grinders, are usually a compromise of the requirements for the two types of work, universal grinders requiring some rotating or swiveling means as well as elevating means for bringing the wheel to various angles and to various elevations relative to the work; whereas, a surface grinder need only have its wheel perpendicular to the path of travel of the workpiece on a table. All of the requirements for both cylindrical and surface grinders can be met if the wheels are mounted on a substantially horizontal spindle and if such spindle is carried on a rotating support which can be elevated vertically relative to a base and work supporting and moving means, without sacrificing any of the essential requirements for either type of grinder.

Some of such requirements are rigidity and stability of the grinding wheel mounting in which one wheel is used for flat surface grinding and another wheel is used for cylindrical grinding, freedom in placing and in movement of workpieces of a size usually handled in a given machine, minimized wear particularly of the wheel spindle support and maintenance of parallelism and perpendicular relationship of parts so that the grinding wheels and the workpieces will remain in the proper relation regardless of positioning of the wheel relative to a particular workpiece. Another requirement is that the saddle and the table be placed close to the base or bed and so made as to avoid tilting and to minimize the action of any side thrusts on the saddle and table or workpiece.

It is therefore an object of the present invention to provide a grinding machine which will serve adequately both for flat surface and for cylindrical grinding and in which the grinding wheel head or mounting provides a horizontal spindle and is capable of swiveling and of elevation while the interfitting parts are protected against abrasive dust in all positions for both types of grinding.

Another object of the invention is to provide a universal grinder with grinding wheels mounted substantially at the center of the path of movement of the workpiece for utilizing the full stroke of the parts carrying the workpiece regardless of which of two grinding wheels are used severally for flat surface and for cylindrical grinding.

Another object of the invention is to provide a universal grinder having a rotatable and axially movable mounting for the grinding wheel spindle whereby the wheels are easily and quickly brought into the preferred relationships with the workpieces for different kinds of grinding, surfaces on the mounting being capable of coaction with the grinder table for accurately and simply obtaining the desired relationship of the grinding wheels to the workpieces by use of an indicator set on the table.

Another object of the invention is to provide a universal grinder in which a saddle and table produce the minimum of elevation of the workpiece above the base or bed of the machine so that the ways guiding saddle and table movements may more easily keep such movements parallel to and perpendicular severally to other parts of the machine.

Another object of the invention is to provide a universal grinder with a work saddle and table construction and construction of the ways therefor such that side surfaces of the saddle and table coact with the ways to resist side thrusts on the table without transfer of such thrusts to a vertical direction, and vice versa which could result in rising or tilting of the saddle or table.

Another object of the invention is to provide a grinder which will be satisfactory for both cylindrical and plane surface grinding and in which the parts are light and have a minimum of machine work for reduction in cost but are well adapted to maintaining accurate relationships of the grinder parts.

Advantages and objects other than those above set forth will be apparent from the following description when read in connection with the accompanying drawings in which:

Figure 3 is an "exploded" perspective view of the base or bed and the movable saddle and table of the present device;

Figure 4 is a perspective view with portions broken away, of the saddle of the base grinder;

Figure 5 is a fragmentary view in cross-section showing the means for moving the saddle;

Figure 6 is a view similar to Figure 5 but showing the means for moving the table;

Figure 7 is a cross-sectional view on the vertical plane of line 7—7 of Figure 1 of the column for positioning and supporting the grinding wheels;

Figure 8 is a cross-sectional view on the plane of line 8—8 of Figure 7;

Figure 9 is a view partially in elevation and partially in cross-section on a vertical plane through the line 9—9 of Figure 8 but, with the grinding wheels removed;

Figure 10 is a diagrammatical view of a portion of the grinder base and column support;

Figure 11 is a cross-sectional view on the horizontal plane of line 11—11 of Figure 10;

Figure 12 is an enlarged fragment of a portion of the structure shown, generally in Figure 7; and Figure 13 is a perspective view of one of the guide lugs shown in Figure 7.

Figure 1:
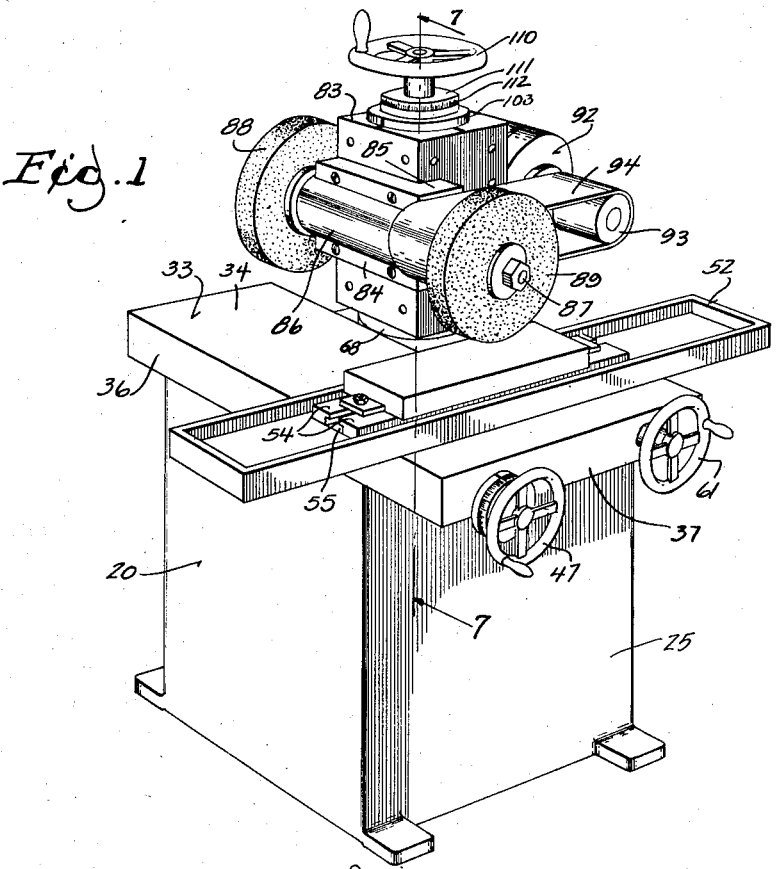
Figure 1 is a perspective view of a grinder of the present invention with a workpiece mounted thereon and the grinding head positioned for surface grinding.
Figure 2:
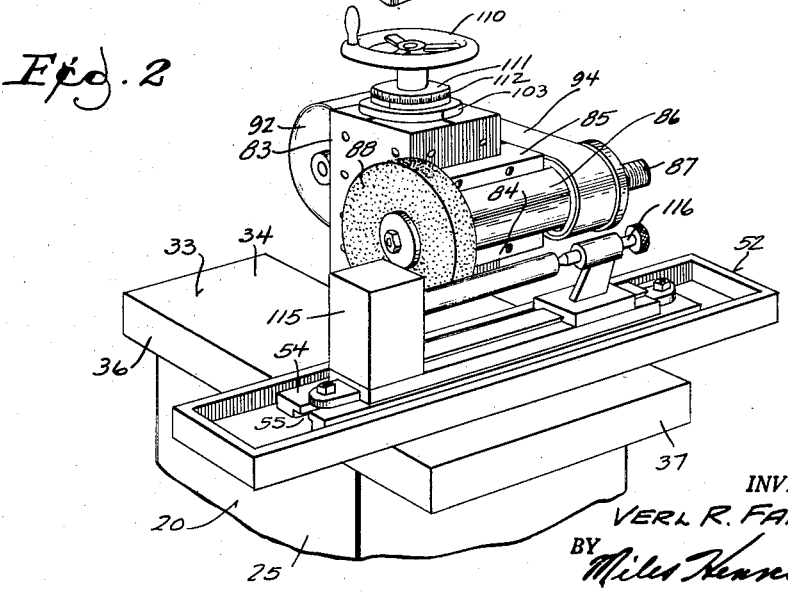
Figure 2 is a fragmentary view similar to Figure 1 but showing a cylindrical workpiece mounted thereon and the grinding head position for external cylindrical grinding.

Referring particularly to the drawings, the reference numeral 20 generally designates the base or bed of the present device, which is preferably substantially cubical with closed sides and top and which may comprise a frame covered by sheet metal provided the frame and a top plate 21 forming a bed are sufficiently heavy to support other parts without distortion. On the top plate 21 (see Figure 3) are fixed two spaced rectangular bars 22, 23 to provide ways for movement of a saddle and a single block or bar 24 for also supporting the saddle. The sidewall 25 of the base has a threaded aperture 26 adjacent an end of the ways 22, 23, for receiving portions of the means for moving a saddle. A hole 27 is formed in the bed plate 21 adjacent one corner thereof to receive a column for mounting and positioning grinding wheels. The base 20 is stiffened by an internal gusset plate 28 (see Figures 10 and 11), with a hole for receiving a tube 29 extending into the hole 27 in the bed 21.

The base parts must have sufficient thickness to give the bed ample strength for supporting other parts without distortion and the bed top and tube should have additional thickness to allow for finish machining after the complete assembly is welded and normalized. The bar 23 may be adjustable for proper spacing and paralleling with the bar 22 which is mounted in a fixed position along one edge of the base.

A saddle 33 (Figures 3, 4 and 5) is to be slidable in one direction on the ways 22, 23 and bar 24 and is of generally L-shaped form. The saddle includes a plate 34 with skirts 35, 36, 37 and 38 around the outer peripheral edge of the plate, the skirt portion 37 having two apertures 39 and 40 therethrough. A rib 42 is attached to the underside of the saddle and preferably extends from skirt portion 35 to skirt portion 37 to enter the space between the ways 22 and 23. Pairs of pads 43, 44 are attached to the saddle alongside the rib for bearing on the ways while a pad 45 bears on the base bar 24. The rib 42 is of such width that when finished parallel and straight after welding it will enter the space between ways 22 and 23. The tops of way bars 22, 23 and 24 and of pads 43, 44 and 45 are to be accurately finished to common planes and pads 43, 44 and 45 have grooves retaining and distributing lubricant to the bearing surfaces.

A screw 46 is mounted rotatably in aperture 39 in the saddle skirt 37 and engages the threaded aperture 26 in the base wall 25. The screw is freely rotatable in its skirt mounting as its handwheel 47 is turned and moves the saddle due to screw reaction on the threaded base aperture. A pair of spaced rectangular bars 48, 49 is mounted on the upper side of the saddle top adjacent the skirt side 37 of the saddle to provide guideways for sliding a table relative to the saddle. The saddle has a hole 50 (see Figure 4) for receiving a portion of the means for moving the table relative to the saddle. It will be noted in Figure 4 that only side skirt portions 36 and 37 are complete skirts for their respective sides of the saddle. Bars 48 and 49 have their top surfaces finished to a plane parallel to the top surfaces of bars 43, 44 and block 45. Bar 48 is mounted rigidly and is perpendicular to the rib 42 while bar 49 may be adjustable sideways for proper spacing and paralleling with bar 48.

A table 52 is preferably a single piece shaped in cross-section as generally indicated in Figure 6 with side flanges 53 but with the ends closed as is indicated in Figure 3. The table provides top surface 54 for supporting a workpiece or means for rotatably supporting a workpiece and for attachment of the same thereto by way of the T-slot 55. On its underside, the table is provided with a rib 56 having a toothed rack 57 longitudinally thereto and with surfaces bearing on the ways, 48, 49. Bearing surfaces 58 of the table do not extend for the full length thereof (see Figure 3) and are also formed with lubricant retaining and distributing grooves. A shaft 59 is mounted in the aperture 40 in the saddle skirt 37 and in a boss 60 for free rotation by a handwheel 61 and has a gear 62 for meshing with the table rack 57 to move the table across the saddle at right angles to the direction of movement of the saddle. The bearing surfaces 58 are of about the same length as the saddle ways 48 and 49 and are as broad as the table skirting will permit to avoid tilting of the table. These surfaces are also formed with lubricant retaining and distributing grooves.

It will be noted that both the ways for the saddle and for the table have only horizontal and vertical planes which function independently as bearing surfaces so that deviation from straight line movement in either the horizontal or vertical direction will not be transferred from one direction to another as is the case when V-shaped ways are used. It will be understood ways 48, 49 must define a right angle with rib 42 and that the longer such ways are, the easier it will be to establish and maintain such angle. Both the saddle and table can be made relatively thin between their bearing surfaces and supporting surfaces because rigidity is gained from the skirts around their respective perimeters. Hence, the location at which the workpiece is being ground is much closer to the bearing surfaces of the bed than usual but the skirts protect the bearing surfaces against abrasive dust.

Grinding wheels are mounted on a support vertical to the saddle and table and of which a portion is fixed and other portions can be rotated and elevated. Such support is mounted in hole 27 in the bed 21 and in the tube 29, the bore of the tube being on a center line vertical to the grinder bed surface. The support comprises a stationary hollow column member 67 which is generally cylindrical to fit into the tube 29 and has a flange 68 bearing on the base bed plate 21 and fastened thereto for housing some parts of the grinding wheel supporting structure. An extension 69 is fastened to the lower end of the member 67 and coacts therewith in housing other column parts, and is closed by a nut 70 on its lower end.

The intermediate portion of column 67 is somewhat larger than the portion above the flange 68 and has diametrically opposite vertical slots 71 for preventing rotation of a hollow post 73 as it slides in the internal bearing bores of the column housing and housing extension. The hollow post has enlarged diameter 74 with portions provided with holes and spot-faced to form square flat surfaces for seating and securing lugs 75 for sliding in slots 71. The lugs (see Figure 13) severally consist of a head 75 with a pin 76 to be seated into a center hole in the post section 74 and drawn into place with a screw in each corner of the head.

It will be noted that the bearings guiding vertical movement of post 73 are a considerable distance apart and the lugs 75 acting in slots 71 extend a long distance from the center line of the post, thus giving the post maximum rigidity and accuracy of movement.

The upper end of the post 73 has a plate 82 secured thereon and co-extensive with the outer periphery of the column housing 67 to support a shell or head 83 for swiveling relative to the post. The swiveling head 83 is internally cylindrical and squared externally for the mounting thereon of a bracket 84, 85 with bearings 86 for receiving a spindle 87 on which two grinding wheels 88 and 89 are mounted, and to support the drive for the grinding wheels. The swivel head outer surfaces are accurately made at right angles to each other and the grinding wheel bracket is made with the bracket portions 84 and 85 at a right angle so that the bracket seats accurately and firmly on the swivel head and is adjustably held thereon by bolts 90. Vertical adjustment of the bracket relative to the swivel head is obtained by providing the swivel head with rows of holes for receiving the bolts 90, and allows for the desired initial positioning of the grinding wheels relative to the table and the saddle. The swivel head 83 bears for substantially its entire length on the fixed column housing 67, and the entire grinding wheel mounting is such that the usual height gauge set on the table is sufficient for determining the correct position of the grinding wheels.

The swivel head 83 (see Figures 7 and 12) bears a plate 64 at its lower end to provide a groove for receiving a slip ring 65 to which is attached one end of a bellows seal 66. The other end of the bellows 66 is fixed to the column flange 68. Thus the bellows 66 encloses the portion of the column housing on which the swivel head rotates and slides as it is shifted and elevated, to keep abrasive dust away from the bearing surfaces of the column housing and the swivel head. The slip ring 65 is preferably made with a vertical surface extending well below the plate 64 to act as a baffle for abrasive thrown upwardly toward the groove in which the slip ring moves.

The drive for the grinding wheels comprises a special hollow pulley 91, one end of which is integral with a wheel flange and hub that is suitably secured to the surface grinding end of the spindle 87. The opposite end of the pulley shell is open to permit the bracket portion 85 to extend thru the length of the pulley, thus bringing the bearing 86 close to the surface grinding wheel supported by it. An electric motor 92 is mounted on the face of the swivel head opposite that supporting the grinding wheel bracket and spindle 84—87 and the motor pulley 93 is connected by the belt 94 with the spindle pulley 91. It will be understood that the swivel head face supporting the motor 92 may also be provided with rows of holes for adjusting the position of the motor thereon or that other usual means may be provided for pivoting the motor to keep the belt at the proper tension.

The column post 73 is provided with bushing type radial bearings 100 and a thrust bearing 101 is set into the upper end of the post for supporting a rod 102. Such rod is threaded at its lower end for engaging the column housing nut 70 and extends through a cap 103 fixed on the end of the post by bolts which also pass through plate 82. A flange of the cap 103 extends partially over the end of the swivel head 83 and has set screws 105 therethrough for clamping the swiveling shell on the plate 82, the swivel head 83 being released for rotation when the set screws are backed off the flange of the swivel shell. A handwheel 110 has a hub extending through the cap 103 and fixed to the rod 102 and the handwheel hub has a flange 111 co-extensive with a peripheral surface of the cap 103. Flange 111 bears a scale 112 coacting with a zero marker on the cap. Thus the swivel head, grinding wheels and their drive, can be elevated by turning the handwheel 110 to cause the screw end of the rod 102 to move upwardly through the housing nut 70, and the extent of the elevation can be read on the scale 112.

When surface grinding is to be done, the grinding wheel 89 is used and the swivel head 83 is adjusted to bring the wheel over the table to rotate in a plane parallel with the table movement. The machine in this position operates as a conventional surface grinder.

For cylindrical grinding, wheel 88 is brought into position by swiveling head 83 after loosening screws 105. These screws are re-tightened after the wheel spindle is set parallel with the table movement. It will be noted that in this position, the wheel 88 rotates in a plane perpendicular to the table and in the center of its movement, while the surface grinding end of the spindle is swung completely out of the way. The machine is now ready to operate as a conventional cylindrical grinder and can be equipped with headstock 115 and tailstock 116 having centers of any height within the spindle elevation range.

The swiveling head can be positioned at any place through 360 degrees as may be required for special grinding applications, in the same way as it was set for surface or cylindrical grinding. It will be noted that setting either the surface or cylindrical grinding wheel in proper relationship to the table movement is easily done because the inner surface of bracket portion 85 which is drawn against the swiveling head 83, forms a plane perpendicular to the spindle 87. Thus, adjusting the wheels parallel with or perpendicular to the table is done merely by bringing the swivel head surface contacted by either bracket portion 84 or 85 into a plane parallel with the table movement.

Ordinarily, it is necessary to make certain of the parallel and perpendicular relationships between the table and grinding wheel of a universal grinder, each time the grinder is to be changed from surface grinding to cylindrical grinding or vice versa. A measurement known as "tramming" may be used. Usually a trambar is attached to the grinding wheel spindle to coact with an object moving with the table. Such tramming usually requires removal of a wheel guard or wheel and is unreliable for various reasons unless very carefully performed. The usual result is reluctance to disturb the spindle of a universal grinder after it has once been properly set for one kind of work. With the present structure however, it is necessary only to use a dial type test indicator fastened on the table for movement therewith and coaction with one or another of the plane surfaces of the swivel head on which the wheel bracket is mounted and with the cutting edge of the wheel. Hence, a setting of the present grinder can be checked much more quickly than by the usual tramming method.

Although but one embodiment of the present invention has been illustrated and described, it will be apparent to those skilled in the art that various changes and modifications may be made therein without departing from the spirit of the invention or from the scope of the appended claims.

I claim:

1. In a grinder for both flat surface and cylindrical grinding, a base providing a horizontal bed, a pair of spaced bars mounted on the bed and extending along one edge thereof, a block fixed on the bed along another edge, one surface of the bars and block being in a horizontal plane and other surfaces of the pair of bars being aligned and in parallel relation with the center line of the bed, a saddle bearing on the bars and block and guided by the bars for reciprocal movement relative to the bed, means for reciprocating the saddle, a table bearing on and reciprocable relative to the saddle and guided thereby for movement at a right angle to the direction of saddle movement, means for reciprocating the table relative to the saddle, a column mounted in the bed and extending vertically therefrom, one portion of the column being fixed and another portion thereof being movable, a swiveling head mounted on the movable portion of the column for rotation relative thereto and for raising and lowering thereby, grinding wheels rotatably mounted on the swivel head, and means mounted on the swivel head for driving the grinding wheels.

2. In a grinder for both flat surface and cylindrical grinding, a base providing a horizontal bed of substantially rectangular shape with a hole adjaceent one corner thereof, a gusset plate within the base and with a hole aligned with the bed hole, a tube fixed to the bed and the gusset plate and extending between the holes therein and vertically to the bed, a saddle bearing on the bed and guided thereby for reciprocation in a straight line, means for reciprocating the saddle relative to the bed, a table bearing on the saddle and guided thereby for movement at a right angle to the direction of saddle movement, means for reciprocating the table relative to the saddle, a column mounted in the tube and extending beyond the ends of the tube, one portion of the column being fixed and another portion thereof being movable within the tube, a swiveling head mounted on the movable portion of the column for rotation relative thereto and for raising and lowering thereby, grinding wheels rotatably mounted on the swivel head, and means mounted on the swivel head for driving the grinding wheels.

3. In a grinder for both flat surface and cylindrical grinding, a base providing a horizontal bed, a saddle bearing on and reciprocable relative to the bed and guided thereby, means for reciprocating the saddle relative to the bed, a table bearing on and reciprocable relative to the saddle and guided thereby for movement at a right angle to saddle movement, means for reciprocating the table relative to the saddle, a column mounted on the bed and extending vertically therefrom, one portion of the column being fixed and another portion thereof being movable, a swivel head mounted on the movable column portion for rotation relative thereto and movement longitudinally therewith, the swivel head having external plane surfaces at right angles to one another, a bracket adjustably mounted on the swivel head and formed with a right angle engageable with two surfaces of the swivel head, a spindle rotatably supported by the bracket in parallel relation to the bed and to one of the plane surfaces of the swivel head, grinding wheels mounted on the spindle, and means mounted on the swivel head for driving the grinding wheel spindle.

4. In a grinder for both flat surface and cylindrical grinding, a base providing a horizontal bed, a saddle bearing on and guided by the bed, means for reciprocating the saddle relative to the bed, a table bearing on and reciprocable relative to the saddle, and guided thereby for movement at a right angle to saddle movement, means for reciprocating the table relative to the saddle, a column mounted in the base and extending vertically from the bed and comprising a portion fixed to the base and a portion movable relative to the fixed portion, the fixed column portion being of one diameter adjacent the ends thereof for supporting the movable column portion and of a substantially larger intermediate diameter with diametrically opposite slots therein, lugs mounted on the movable column portion and extending through the slots in the fixed column portion from the post for engagement in the slots at a distance substantially greater than the diameter of the post for limiting rotation of the movable column portion relative to the fixed column portion, a swiveling head mounted on the movable portion of the column for rotation relative thereto and for raising and lowering thereby, grinding wheels rotatably mounted on the swivel head, and means mounted on the swivel head for driving the grinding wheels.

5. In a grinder for both flat surface and cylindrical grinding, a base providing a horizontal bed, a plurality of bars mounted on the bed for forming guideways, a saddle bearing on and between the bars for movement guided thereby, means for reciprocating the saddle relative to the bed, a pair of bars mounted in parallel relation on the saddle and extending at right angle to the guideway bars on the bed, a table bearing on the saddle bars and guided thereby for movement at a right angle to saddle movement, means for reciprocating the table relative to the saddle, a column mounted in and extending from the bed and comprising a housing fixed in the base and extending vertically therefrom, a post within the housing and movable longitudinally thereof, the housing having opposite slots therethrough, lugs on the post extending through the housing slots in close slidable engagement, means for moving the post longitudinally relative to the housing, a swiveling head mounted on the post for rotation relative thereto and longitudinal movement therewith, a bracket on the swivel head for adjustment relative to the bed, a spindle rotatable on the bracket, grinding wheels mounted on the spindle, and means mounted on the swivel head for driving the spindle.

6. In a grinder for both flat surface and cylindrical grinding, a base providing a horizontal bed of substantially rectangular shape, a saddle bearing on the bed and guided thereby for reciprocation in a straight line, means for reciprocating the saddle relative to the bed, a table bearing on the saddle and guided thereby for movement at a right angle to the direction of saddle movement, means for rotatably mounting a work piece on the saddle for cylindrical grinding means for reciprocating the table relative to the saddle, a column mounted in and extending upward from one corner of the base and comprising a housing portion extending above the base bed at a right angle thereto and a post portion axially movable within the housing portion, a swiveling head mounted on the post portion of the column for rotation relative thereto and for raising and lowering thereby, the swivel head being externally rectangular and having adjacent external plane surfaces at right angles to each other and at right angles to the base bed and respectively parallel and perpendicular to the table upper surface, a grinding wheel spindle rotatably mounted on and parallel to a plane surface of the swivel head and parallel to the base bed, grinding wheels mounted on the spindle at different spacings laterally from the swivel head, and means mounted on the swivel head for driving the grinding wheels, the position of the column relative to the base and the spacing of the grinding wheels relative to the spindle center bringing the wheels individually to the center of the base bed upon rotation of the swivel head for severally performing surface and cylindrical grinding at such center.

7. In a grinder for both flat surface and cylindrical grinding, a base providing a horizontal bed, a saddle bearing on the bed and guided thereby for reciprocation in a straight line, means for reciprocating the saddle relative to the bed, a table bearing on the saddle and guided thereby for reciprocation in a straight line at a right angle to the direction of saddle movement, means for reciprocating the table relative to the saddle, a column mounted vertically relative to the bed, the column comprising a housing, a post within the housing and movable longitudinally thereof, the housing having portions of the same diameter from the ends thereof for forming spaced bearings supporting the post at two spaced locations regardless of the relative position of the post longitudinally in the housing, the housing having oppositely positioned slots therethrough between the bearings for the post and the post having lugs extending diametrically therefrom into the slots for preventing rotation of the post relative to the housing, means for moving the post relative to the housing, a swivel head mounted on the post, grinding wheels rotatably mounted on the swivel head, and means mounted on the swivel head for driving the grinding wheels.

References Cited in the file of this patent

UNITED STATES PATENTS

| | | |
|---|---|---|
| 376,814 | Coleman | Jan. 24, 1888 |
| 376,815 | Coleman | Jan. 24, 1888 |
| 898,673 | Nickoloff | Sept. 15, 1908 |
| 1,268,961 | Gorham | June 11, 1918 |
| 2,384,512 | Wiken | Sept. 11, 1945 |
| 2,420,170 | Erikson | May 6, 1947 |